Patented Mar. 14, 1944

2,344,244

UNITED STATES PATENT OFFICE 2,344,244

CATALYTIC HYDROGENATION OF NITRO COMPOUNDS

William Vance Freed and Frank K. Signaigo, Wilmington, Del., assignors to E. I. du Pont de Nemours & Company, Wilmington, Del., a corporation of Delaware No Drawing. Application August 2, 1941, Serial No. 405,144

12 Claims. (Cl. 260—144)

This invention relates to a catalytic process and, more particularly, it relates to a process for the catalytic production of aromatic azo compounds.

For many years aromatic azo compounds have found wide application in chemical industry as intermediates in the synthesis of important dyestuffs. Among a wide variety of materials of this class, simple aromatic azo compounds have assumed particular importance due to the relative ease with which they are converted to the corresponding hydrazo compounds, which undergo transformation to benzidine type derivatives. Aromatic azo compounds may be obtained either by the diazo reaction, by condensation of nitrosobenzene with an arylamine, or by removal of the amino group (by diazotiazation) from aminoazobenzene, or, more generally, by chemical reduction of the nitro compound. These methods are expensive and, in many cases, are found to be commercially impractical due to the complicated chemical operations involved and high consumption and cost of the reagents. A new catalytic process for the production of aromatic azo compounds would present attractive possibilities for commercialization from the standpoint of economy and efficiency.

It is an object of this invention to provide a new and improved catalytic process for the production of aromatic azo compounds. Another object is to provide a process which is efficient and selective in the hydrogenation of aromatic nitro compounds to azo compounds. Still another object is to provide an economical route to the production of desirable azo compounds from cheap raw materials. A further object is to provide a simple and easily manipulated process for the production of azo compounds. Other objects will be apparent from the following description of the invention.

According to this invention an aromatic azo compound is produced by contacting an aromatic nitro compound in the liquid phase under alkaline conditions with hydrogen at hydrogenating temperatures and super-atmospheric pressures in the presence of a sulfactive base metal hydrogenation catalyst.

By the term "sulfactive hydrogenation catalyst" as used herein and in the claims, we mean a catalyst prepared as described in U. S. Patents 2,221,804 and 2,230,390, and which is active for the catalytic hydrogenation of the sulfur in organic multisulfides, organic sulfur compounds having carbon to sulfur unsaturation, and organic sulfur compounds having sulfur to oxygen unsaturation.

In general, in practicing this invention as a batch process a pressure vessel is charged with the aromatic nitro compound, catalyst, and alkaline solvent, e. g., aqueous alcoholic alkali, the vessel is closed, charged with hydrogen to the desired pressure, and the reaction mixture heated with agitation while maintaining the pressure at the desired point by periodic additions of hydrogen. After there is no further drop in pressure, which indicates that hydrogen absorption has stopped, the vessel is cooled, opened, and the contents discharged. From the reaction mixture the azo compound is recovered by methods well known to the art.

The following examples serve to illustrate the processes of this invention and demonstrate preferred conditions for the catalytic conversion of aromatic nitro compounds to the corresponding azo compounds. The proportions of reactants, catalyst, etc., are referred to in terms of parts by weight unless otherwise stated.

Example I

A sulfactive hydrogenation catalyst is prepared as follows: A solution of 240 parts of sodium sulfide nonahydrate and 64 parts of sulfur in 800 cc. of water is added with stirring to a solution of 238 parts of cobaltous chloride hexahydrate in 500 cc. of water. The black precipitate is filtered with suction and washed free of soluble salts with water. To avoid oxidation upon exposure to air the catalyst is stored and used in the form of an aqueous paste. This catalyst in the form of a water paste is used to hydrogenate an aromatic nitro compound to an azo compound in the following manner:

Sixty parts of nitrobenzene, 90 parts of isopropanol, 6 parts of sodium hydroxide in 6 parts of water, and 2 parts (dry basis) of the above cobalt polysulfide catalyst are charged into a high pressure hydrogenation autoclave provided with a device for agitating the contents thoroughly. Hydrogen is injected into the autoclave and the mixture heated so that at 115° C. the hydrogen pressure is 500 lbs. per square inch. In a 3 hour reaction period there is a total pressure drop of 1000 to 1100 lbs. per square inch. After this period of reaction, the autoclave is cooled and the crude reaction mixture is filtered to remove the catalyst. The filtrate is diluted with 500 cc. of water and extracted with portions of benzene. By distillation of the extract at reduced pressure the solvent is removed and upon further distillation there is obtained 11 parts of aniline, B. P. 82° to 85° C. at 19 mm.; 28.5 parts of azobenzene, B. P. 125° to 135° C. at 3 mm., M. P. 67° to 68° C. and 2 parts of high-boiling residue.

Example II

A mixture of 60 parts of o-nitrotoluene, 90 parts of isopropanol, 14 parts of a 50% aqueous solution of sodium hydroxide, and 0.9 part (dry basis) of cobalt polysulfide catalyst prepared as in Example I is charged into a hydrogenation autoclave equipped with an efficient device for agitating the contents. The mixture is heated to 125° C. and treated with hydrogen under 500 lbs. per square inch pressure for two hours. During this time there is a total pressure drop of 1000 lbs. per square inch. The reaction product is worked up according to the procedure outlined in Example I. The products are as follows: o-toluidine, B. P. 64° to 65° C. at 5 mm., 14 parts; azotoluene, M. P. 54° to 55° C., B. P. 151° to 156° C. at 5 mm., 28 parts; and residue, 1.5 parts.

Example III

Sixty parts of o-nitroanisole is hydrogenated at 115° C. under a total pressure of 500 lbs. per square inch in the presence of 90 parts of isopropanol, 5 parts of potassium hydroxide in 5 parts of water, and 1.7 parts (dry basis) of the cobalt polysulfide catalyst of Example I. Absorption of hydrogen is complete after 3 hours with a total pressure drop of 1000 lbs. per square inch. The catalyst is removed from the reaction mixture by filtration and the crude catalyst-free product is diluted with water and extracted with benzene. The combined extracts are washed with dilute hydrochloric acid to remove o-anisidine. From the acid washings there are recovered 19 parts of o-anisidine, B. P. 64° to 67° C. at 3 mm. Upon removal of the benzene by evaporation there is obtained 21 parts of azoanisole, M. P. 151° to 152° C.

Example IV

One hundred parts of nitrobenzene is hydrogenated at 125° C. under a total pressure of 500 lbs. per square inch in the presence of 50 parts of isopropanol, 5 parts of sodium hydroxide in 5 parts of water, and 0.75 part (dry basis) of the cobalt polysulfide catalyst of Example I. During 4½ hours there is a total pressure drop of 2200 lbs. per square inch. The catalyst is removed from the reaction mixture by filtration and the crude catalyst-free product placed in a vessel equipped for efficient agitation. The product is diluted with an equal weight of water and 200 parts of 37% hydrochloric acid is added dropwise to the stirred mixture at ice bath temperatures. Agitation is continued at 0° to 5° C. for 4 to 6 hours and 30 parts of iron powder is added and the reaction mixture further agitated for 10 hours. The reaction mixture is filtered and the benzidine hydrochloride cake is washed with 200 parts of 15% sodium chloride solution. The filter cake is dissolved in hot water and 1 part of activated carbon is added to the hot solution. The boiling solution is filtered, the filtrate is cooled to 0° C., and 50 parts of sodium chloride is added. The benzidine hydrochloride is filtered and slurried in 400 parts of water and 40 parts of concentrated sulfuric acid is added to the slurry. Sixty-four parts of benzidine sulfate is obtained. Thirteen parts of aniline is recovered from the original acid filtrate.

Although certain conditions of temperature, pressure, concentration of reactants, nature of reaction medium and the like have been indicated in the above examples, it will be apparent that these conditions can be varied within the scope of this invention.

In general the process of this invention is operable at temperatures from about 75° C. to about 200° C. and at pressures ranging from atmospheric to a maximum determined by the practical limitations of the reaction vessel. The process is generally operated at temperatures ranging from about 90° C. to about 130° C. and under a total pressure of from about 400 to about 1000 pounds per square inch.

The conversion of aromatic nitro compounds to azo compounds, in accordance with the process of this invention, is carried out under alkaline conditions in the presence of an organic solvent. Suitable organic solvents include the aliphatic and aromatic hydrocarbons, ethers, ketones, and alcohols. Of these the preferred solvents are the secondary aliphatic monohydric alcohols and even more preferably the lower secondary aliphatic monohydric alcohols. From the standpoint of yield performance, low cost, and solvent action on raw materials and reaction products the outstanding lower secondary aliphatic alcohol is isopropanol. For practical reasons the ratio of organic solvent to nitro compounds is maintained in the range of from 0.5 to 2 and 0.66 to 1.

It is of particular importance in the practice of this invention to carry out the reaction in the presence of a small amount of water which serves not only as a solvent for the alkali but also serves to lower the temperature at which hydrogen absorption is initiated and prevents undesirable amine formation, which accompanies higher temperature operations. The absence of water from the reaction system necessitates temperatures above 150° C. to promote hydrogenation and is accompanied by a prolonged induction period. A suitable amount of water is at least that which is equivalent in weight to the alkali used.

A variety of alkalis can be used in practicing this invention. Among these are inorganic hydroxides, e. g., sodium hydroxide, potassium hydroxide, barium hydroxide, or caesium hydroxide; organic amines, e. g., ethanolamine, trimethylamine, alkali metal carbonates, e. g., potassium carbonate, lithium carbonate; quaternary ammonium compounds, e. g., tetramethylammonium hydroxide, and the like. Potassium hydroxide and sodium hydroxide are the preferred alkalis because of their effectiveness and low cost. Generally an amount of alkali ranging from 5 to 15% of the weight of nitro compound is employed.

Catalysts suitable for use in converting aromatic nitro compounds to azo compounds can be selected from the group of sulfactive materials comprising the sulfides and polysulfides of metals of groups I, VI, and VIII of the periodic table. Typical examples of catalyst compositions are the sulfides of cobalt, molybdenum, iron, nickel, tungsten, and chromium and combinations of these. These catalysts are conveniently prepared according to the methods described in the copending applications of F. K. Signaigo, Serial No. 319,241, filed Feb. 16, 1940, and Serial No. 319,242, filed Feb. 16, 1940, and that of B. W. Howk, Serial No. 353,936, filed August 23, 1940. The selection of a particular catalyst for the hydrogenation will depend to a large extent on the particular aromatic nitro compound being treated and on considerations of temperature, pressure, nature of reaction medium, etc. Generally speaking, the catalysts are used in the form of unsupported powders or deposited on suitable supports such as kieselguhr, pumice, etc. When the process is operated as a continuous operation the catalysts are employed in the massive state. Usually the amount of catalyst employed varies from .1 to 10% on the weight of the aromatic nitro compound. Cobalt polysulfide catalysts are preferred in the practice of this invention because they are more active and selective than other base metal sulfides.

The conversion of various aromatic nitro compounds to the corresponding azo compounds has been illustrated in the foregoing examples. This invention is not limited, however, to these particular materials and is applicable to other aromatic nitro compounds. In addition to the compounds of the examples the following nitro compounds can be used in the practice of this invention: nitroaniline, nitrobenzoic acid, nitroxylene, nitrophenol, nitrophenetol, nitrocresol, nitrocresol methyl ether, p-nitro-o-aminophenol, m-nitro-p-anisidine, m-nitro-p-toluidine, 4-nitro-2-aminoanisole, nitrobenzidine, nitronaphthalene, nitroanthracene, dinitrobenzene, dinitrotoluene, 2,4-dinitroaniline, dinitrophenol, trinitrophenol, etc.

The aromatic azo compounds of this invention comprise an important class of organic compounds which are especially useful as intermediates in the production of various dyestuffs. These products can be converted to hydrazo compounds, and they also find wide application as intermediates for the synthesis of insecticides, photographic materials used in diazo type processes, and bactericides, etc.

Having described in detail the preferred embodiments of the invention it is to be understood that we do not limit ourselves to the specific embodiments thereof except as defined in the following claims.

We claim:

1. The process for the direct conversion of aromatic nitro compounds to azo compounds which comprises catalytically hydrogenating an aromatic nitro compound in the liquid phase in the presence of an alkali and a sulfactive hydrogenation catalyst.

2. The process in accordance with claim 1 characterized in that the reaction is carried out in the presence of an organic solvent.

3. The process in accordance with claim 1 characterized in that the reaction is carried out in the presence of an alcoholic solvent.

4. The process of claim 1 characterized in that the hydrogenation catalyst is a sulfactive cobalt sulfide.

5. The process for the direct conversion of aromatic nitro compounds to azo compounds which comprises catalytically hydrogenating an aromatic nitro compound in the liquid phase in the presence of a medium comprising aqueous alkali, and a sulfactive hydrogenation catalyst.

6. The process in accordance with claim 5 characterized in that the reaction is carried out in the presence of an organic solvent.

7. The process in accordance with claim 5 characterized in that the reaction is carried out in the presence of a secondary alcohol.

8. The process of claim 5 characterized in that the hydrogenation catalyst is a sulfactive cobalt sulfide.

9. In the conversion of an aromatic nitro compound directly to an azo compound, the improvement which comprises catalytically hydrogenating said aromatic nitro compound in the liquid phase at a temperature between 75° and 200° C. and at a pressure in excess of atmospheric in the presence of an aqueous alkali, an organic solvent, and a sulfactive cobalt sulfide hydrogenation catalyst.

10. The process in accordance with claim 9 characterized in that the reaction is carried out in the presence of isopropyl alcohol.

11. The process of claim 9 characterized in that the reaction is carried out at pressures in excess of 400 pounds per square inch.

12. In the conversion of an aromatic nitro compound directly to an azo compound, the improvement which comprises catalytically hydrogenating said aromatic nitro compound in the liquid phase and a pressure in excess of atmospheric and at a temperature between 75° and 200° C. in the presence of an aqueous alcoholic alkali and a sulfactive hydrogenation catalyst selected from the group consisting of the sulfides and polysulfides of molybdenum, iron, cobalt and nickel.

WILLIAM VANCE FREED.
FRANK K. SIGNAIGO.